US011913257B2

(12) United States Patent
Piccoli et al.

(10) Patent No.: US 11,913,257 B2
(45) **Date of Patent: *Feb. 27, 2024**

(54) PRODUCT SECURITY DEVICE WITH ENGAGEMENT PIN

(71) Applicant: CHECKPOINT SYSTEMS, INC., Thorofare, NJ (US)

(72) Inventors: Anthony F. Piccoli, West Deptford, NJ (US); Sze Ming Yuen, Deptford, NJ (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 657 days.

This patent is subject to a terminal disclaimer.

(21) Appl. No.: 17/082,383

(22) Filed: Oct. 28, 2020

(65) Prior Publication Data

US 2021/0040778 A1 Feb. 11, 2021

Related U.S. Application Data

(63) Continuation-in-part of application No. 16/415,493, filed on May 17, 2019, now Pat. No. 11,091,938, (Continued)

(51) Int. Cl.
*E05B 73/00* (2006.01)
*E05B 69/00* (2006.01)
(Continued)

(52) U.S. Cl.
CPC .......... *E05B 73/0017* (2013.01); *E05B 19/26* (2013.01); *E05B 47/0045* (2013.01); *E05B 69/00* (2013.01); *E05B 73/0052* (2013.01)

(58) Field of Classification Search
CPC .. E05B 73/0017; E05B 19/26; E05B 47/0045; E05B 69/00; E05B 73/0052; E05B 73/00; Y10T 70/5004; Y10T 70/5013
(Continued)

(56) References Cited

U.S. PATENT DOCUMENTS 4,483,049 A 11/1984 Gustavsson et al.
4,651,136 A 3/1987 Anderson et al.
(Continued)

FOREIGN PATENT DOCUMENTS

EP 0233163 2/1991
EP 1272722 11/2006
(Continued)

*Primary Examiner* — Suzanne L Barrett
(74) *Attorney, Agent, or Firm* — McDonald Hopkins LLC

(57) ABSTRACT

Example product security devices and associated methods are provided. An example product security device may include a first jaw and a second jaw that are operably coupled together to slide between an open position and a closed position. The example product security device may include a locking mechanism. In a locked state, the locking mechanism may permit movement of the first jaw towards the second jaw but prevent movement away from the second jaw. The example product security device may also include a product engagement pin. The product engagement pin may fasten the product security device to a product by piercing through the product and being received by the second jaw. A shroud having a shroud orifice may surround the product engagement pin and be operably coupled to the first jaw such that the shroud is movable relative to the product engagement pin. The example security device may also include a signal emitting component, a QR code, a barcode, or combination thereof.

21 Claims, 15 Drawing Sheets

Related U.S. Application Data which is a continuation of application No. 15/481,084, filed on Apr. 6, 2017, now Pat. No. 10,301,852.

(51) Int. Cl.
*E05B 47/00* (2006.01)
*E05B 19/26* (2006.01)

(58) Field of Classification Search
USPC .......................................... 70/57, 57.1, 58, 59
See application file for complete search history.

(56) References Cited

U.S. PATENT DOCUMENTS

| | | | | |
|---|---|---|---|---|
| 4,670,950 | A | 6/1987 | Wisecup | |
| 4,685,234 | A | 8/1987 | Anderson et al. | |
| 5,208,580 | A | 5/1993 | Crossfield | |
| 5,680,681 | A | 10/1997 | Fuss | |
| 6,754,939 | B2 | 6/2004 | Belden et al. | |
| 7,249,401 | B2 | 7/2007 | Copen et al. | |
| 7,412,857 | B2 | 8/2008 | Kolton et al. | |
| 7,441,424 | B2 * | 10/2008 | Saitoh | F21V 21/088 70/57.1 |
| 7,458,241 | B2 | 12/2008 | Belden, Jr. | |
| 7,961,100 | B2 | 6/2011 | Wyatt et al. | |
| 8,035,518 | B2 | 10/2011 | Kolton et al. | |
| 8,305,219 | B2 | 11/2012 | Yang | |
| 8,416,082 | B2 | 4/2013 | Sayegh et al. | |
| 8,500,032 | B2 | 8/2013 | Shute et al. | |
| 8,567,220 | B1 | 10/2013 | Mchatet | |
| 9,129,201 | B2 | 9/2015 | Mazoki et al. | |
| 9,245,432 | B2 | 1/2016 | Yang | |
| 9,355,539 | B2 | 5/2016 | Yang | |
| 9,637,951 | B2 | 5/2017 | Luo | |
| 9,652,954 | B2 | 5/2017 | Piccoli et al. | |
| 9,790,715 | B2 | 10/2017 | Bouan | |
| 10,301,852 | B2 * | 5/2019 | Piccoli | E05B 47/0045 |
| 11,091,938 | B2 * | 8/2021 | Piccoli | E05B 19/26 |
| 2007/0152836 | A1 | 7/2007 | Nagelski et al. | |
| 2007/0205902 | A1 | 9/2007 | Cote et al. | |
| 2007/0295039 | A1 | 12/2007 | Belden | |
| 2008/0291029 | A1 | 11/2008 | Skjellerup et al. | |
| 2012/0050042 | A1 | 3/2012 | Shute et al. | |
| 2012/0073336 | A1 | 3/2012 | Thoonsen | |
| 2014/0159902 | A1 | 6/2014 | Yang | |
| 2014/0259836 | A1 | 9/2014 | Piccoli et al. | |
| 2015/0161863 | A1 | 6/2015 | Yang | |
| 2016/0321894 | A1 | 11/2016 | Schneider | |
| 2017/0004691 | A1 | 1/2017 | Alicot et al. | |
| 2017/0342747 | A1 | 11/2017 | Sayegh et al. | |

FOREIGN PATENT DOCUMENTS

| | | |
|---|---|---|
| EP | 1892358 | 4/2010 |
| WO | 2012020105 | 2/2012 |

* cited by examiner

PRODUCT SECURITY DEVICE WITH ENGAGEMENT PIN

CROSS-REFERENCE TO RELATED APPLICATIONS

This application is a Continuation-in-part of application Ser. No. 16/415,493, filed on May 17, 2019, which is a continuation of application Ser. No. 15/481,084, filed on Apr. 6, 2017, now U.S. Pat. No. 10,301,852.

FIELD OF THE INVENTION

Embodiments of the present invention relate generally to loss prevention technologies and, more particularly, relate to systems, apparatuses, and methods for protecting articles, including retail products, from theft.

BACKGROUND OF THE INVENTION

Retail stores employ various loss prevention techniques to prevent and deter theft. One manner of addressing theft is to secure a retail product with a device that triggers an alarm at the exit of the retail establishment if the device is not first removed by store personnel during a purchasing transaction. While a variety of product security devices have been implemented in retail settings, there continues to be demand for new devices that attach to products or otherwise protect products in new and unique ways.

BRIEF SUMMARY OF THE INVENTION

Example embodiments include apparatuses and methods related to a product security device having a shrouded engagement pin. One example embodiment is in the form of an example product security device. The example product security device may comprise a first jaw and a second jaw, wherein the first jaw and the second jaw are operably coupled together to slide between an open position and a closed position. The example product security device may also comprise a locking mechanism operably coupled to the first jaw and the second jaw, wherein, in a locked state, the locking mechanism is configured to permit movement of the first jaw towards the second jaw but prevent movement of the first jaw away from the second jaw. The example product security device may also comprise a product engagement pin affixed to the first jaw, with the product engagement pin configured to fasten the product security device to a product by piercing through the product and being received by the second jaw. The example product security device may also comprise a shroud having a shroud orifice. The shroud may surround the product engagement pin and be operably coupled to the first jaw such that the shroud is movable relative to the product engagement pin. The product engagement pin may be configured to pass through the shroud orifice and engage the product as the first jaw and second jaw transition from the open position to the closed position and the shroud retracts into the first jaw. The example product security device may also contain an EAS (Electronic Article Surveillance) device. The example product security device may further comprise one or more signal emitting devices such as a radio frequency (RFID), Bluetooth, BLE (Bluetooth Low Energy), UWB (Ultra Wide Band), near field communication (NFC) or Wi-fi device for receiving and transmitting data.

According to some example embodiments, another example product security device may be provided. The example product security device may comprise a first jaw and a second jaw, wherein the first jaw and the second jaw are operably coupled together to slide between an open position and a closed position. The example product security device may also comprise a product engagement pin affixed to the first jaw, with the product engagement pin configured to fasten the product security device to a product by piercing through the product and being received by the second jaw. The example product security device may also comprise a shroud having a shroud orifice. The shroud may surround the product engagement pin and be operably coupled to the first jaw such that the shroud is movable relative to the product engagement pin. The product engagement pin may be configured to pass through the shroud orifice and engage the product as the first jaw and second jaw transition from the open position to the closed position and the shroud retracts into the first jaw. The example security device may also contain an EAS (Electronic Article Surveillance) device. The example security device may further comprise one or more of a signal emitting device such as a radio frequency (RFID), Bluetooth, BLE (Bluetooth Low Energy), UWB (Ultra Wide Band), NFC (Near Field Communication) or Wi-fi device for receiving and transmitting data.

Example methods are also provided. One example method comprises receiving a key at a locking mechanism of a product security device, and transitioning, in response to application of the key, the locking mechanism from a locked state to an unlocked state to thereby release a first jaw of the product security device from locked engagement with a second jaw of the product security device. The example method may also comprise sliding, in response to the release of the locked engagement between the first jaw and the second jaw, the first jaw away the second jaw due to an urging caused by a release spring disposed between the first jaw and the second jaw, and ejecting a product off of a product engagement pin as the product engagement pin retracts through an orifice of a shroud surrounding the product engagement pin. In this regard, the product engagement pin may be affixed to the first jaw and be urged away from the second jaw by the release spring. Further, the shroud may be urged towards the second jaw by a shroud spring disposed between the shroud and the first jaw to extend the shroud into an extended position. In the extended position the shroud may extend beyond the tip of the product engagement pin.

BRIEF DESCRIPTION OF THE DRAWINGS

Figure 1:
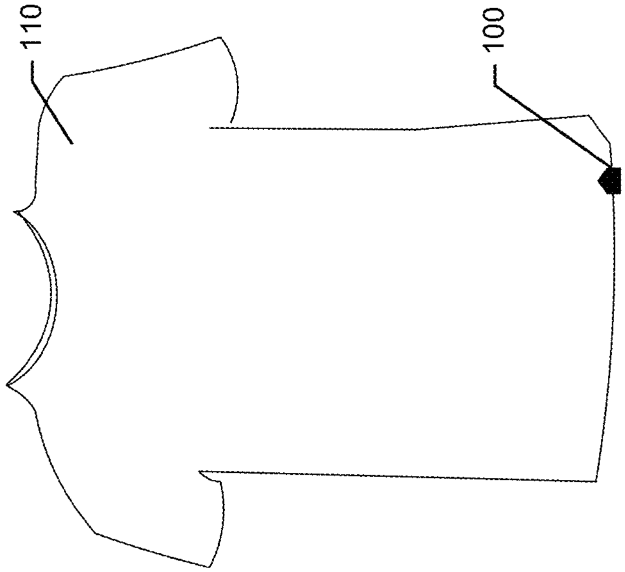
Figure 2:
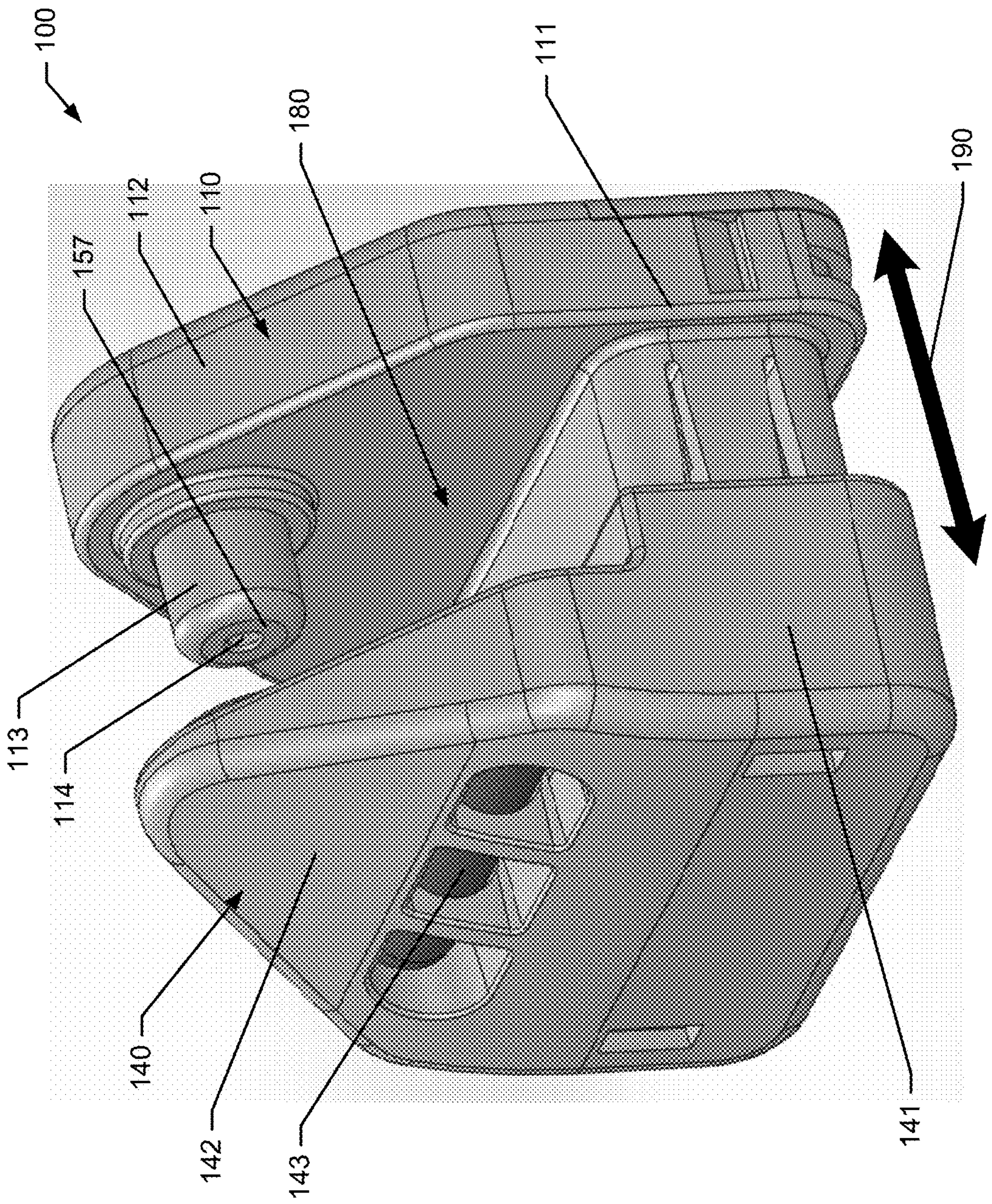
Figure 2A:
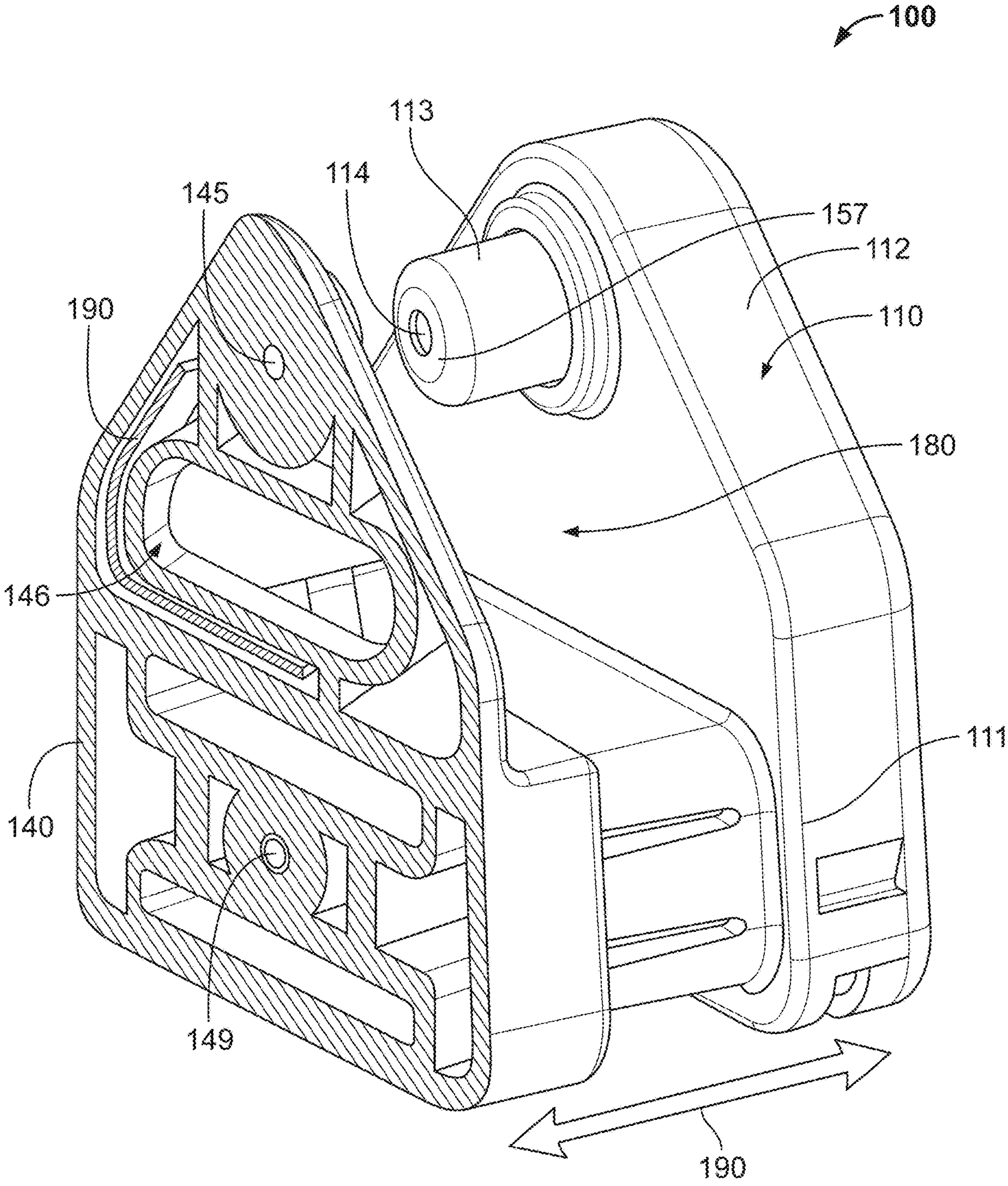
Figure 3:
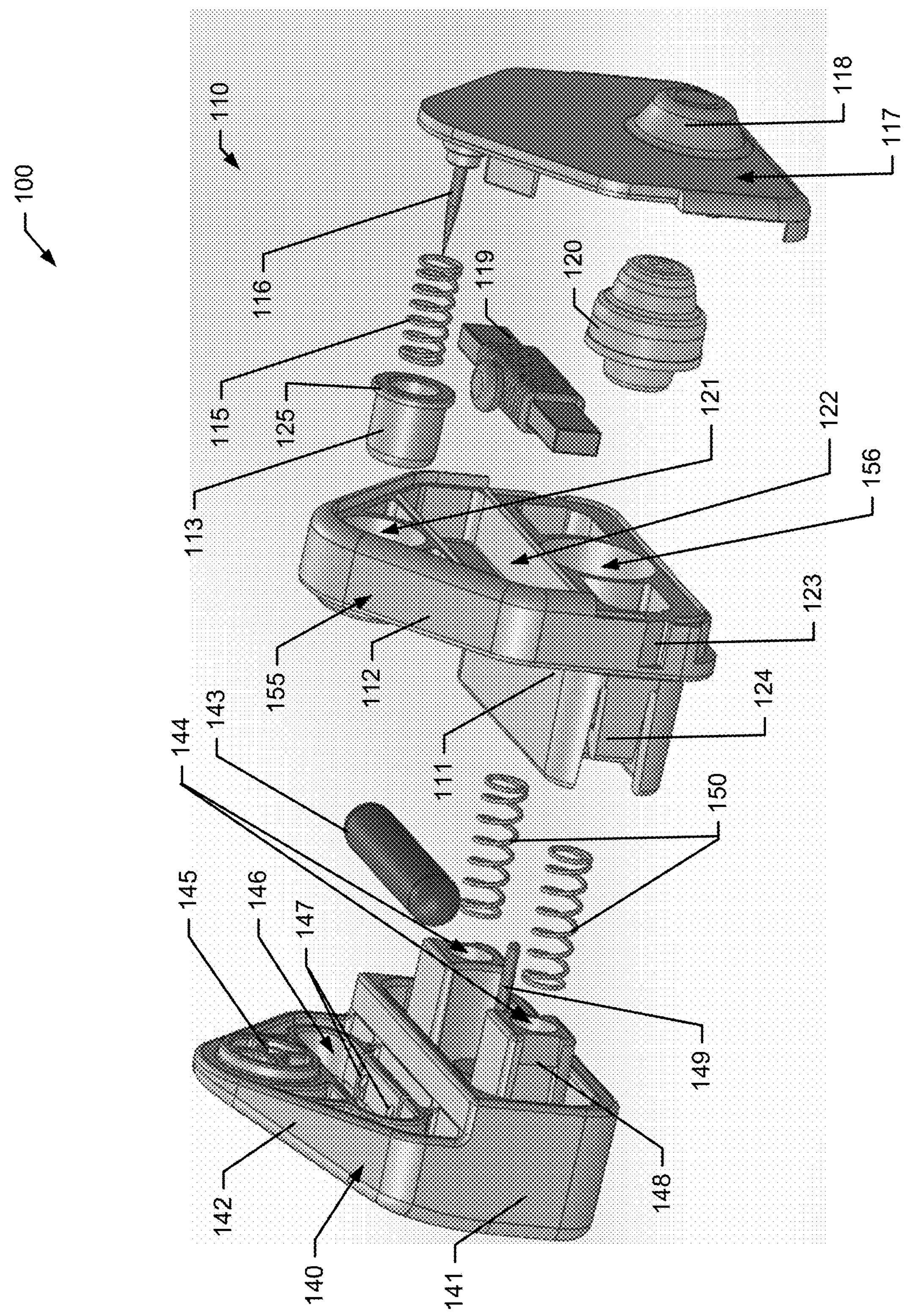
Figure 3A:
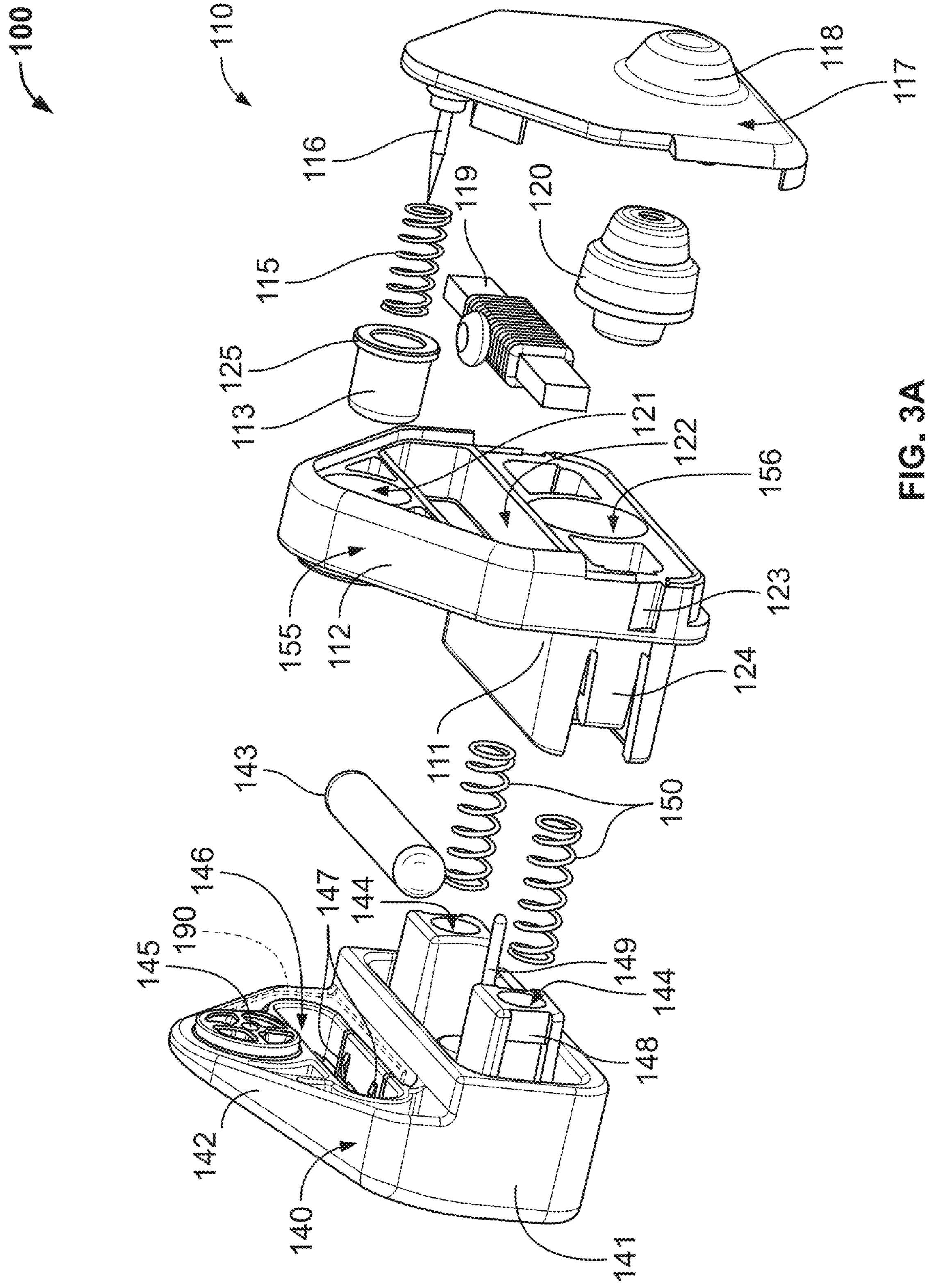
Figure 4:
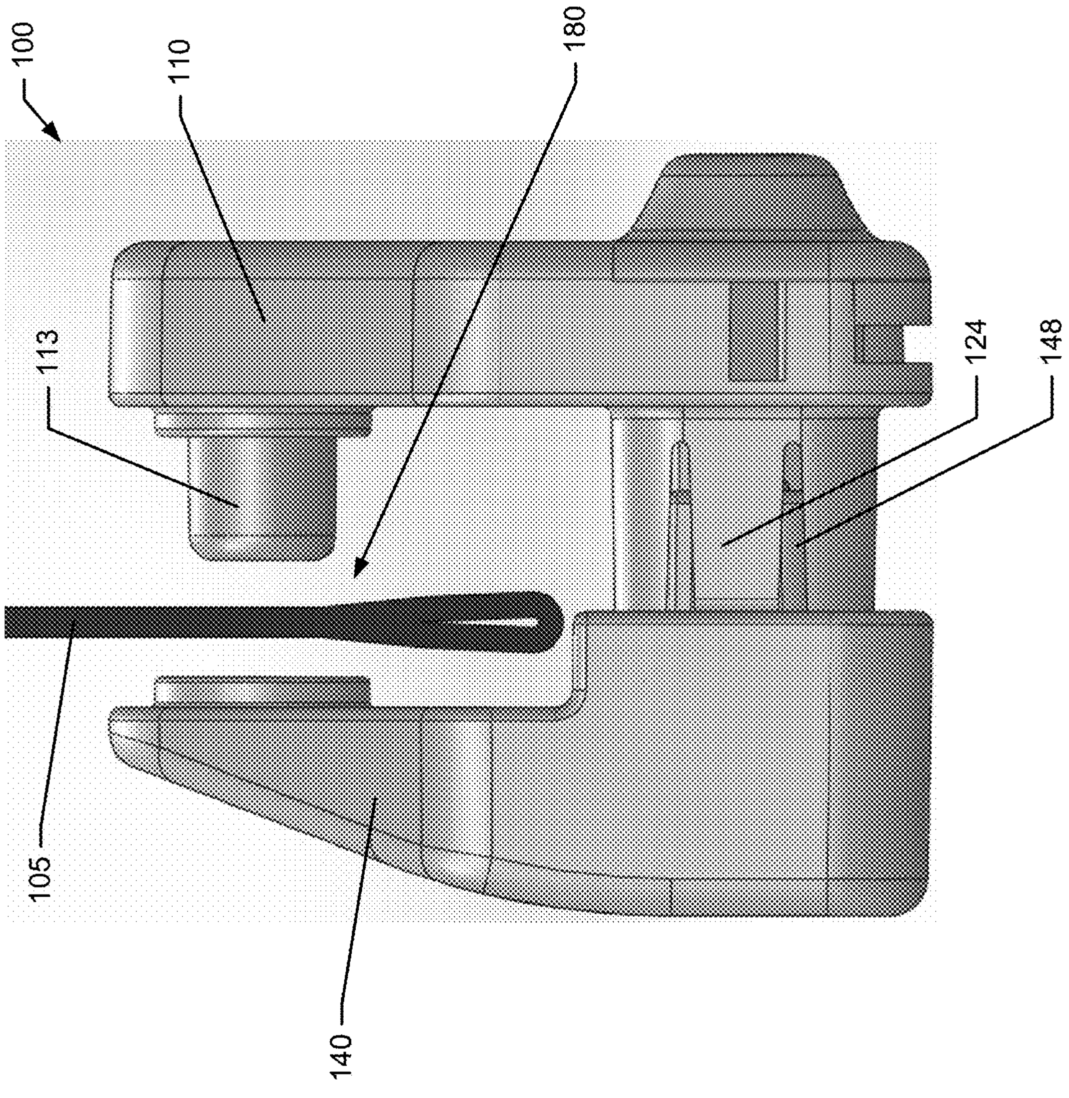
Figure 5:
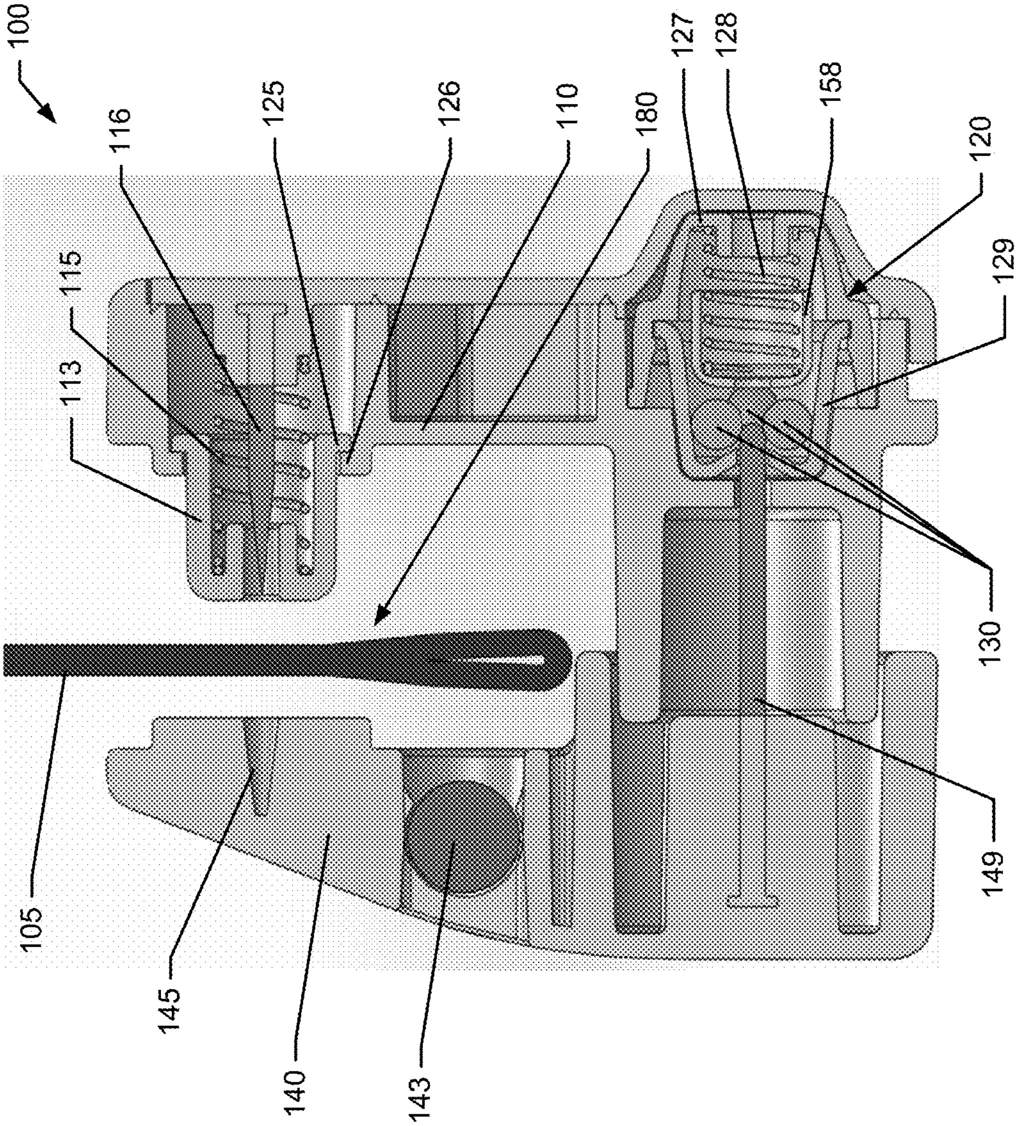
Figure 5A:
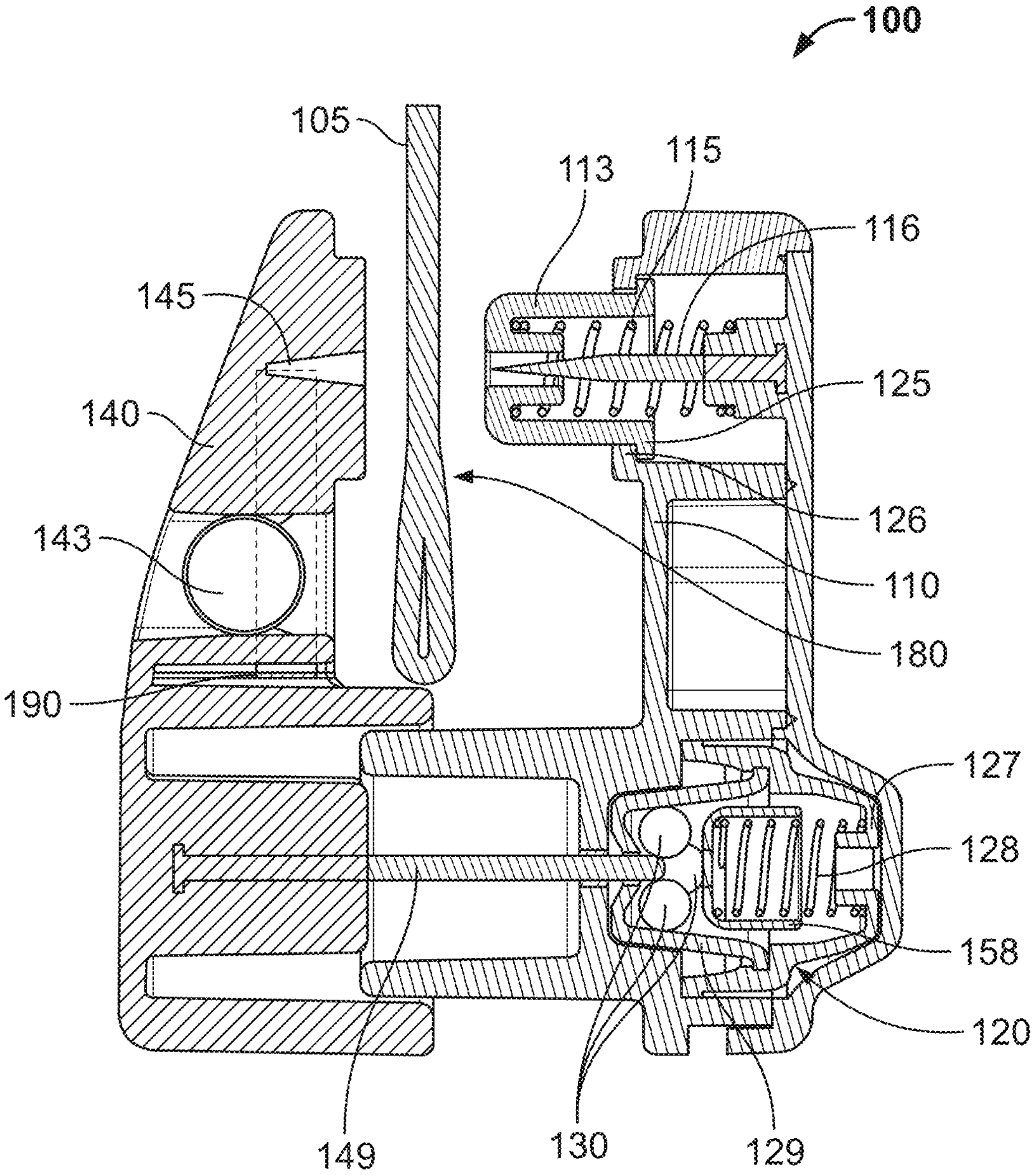
Figure 6:
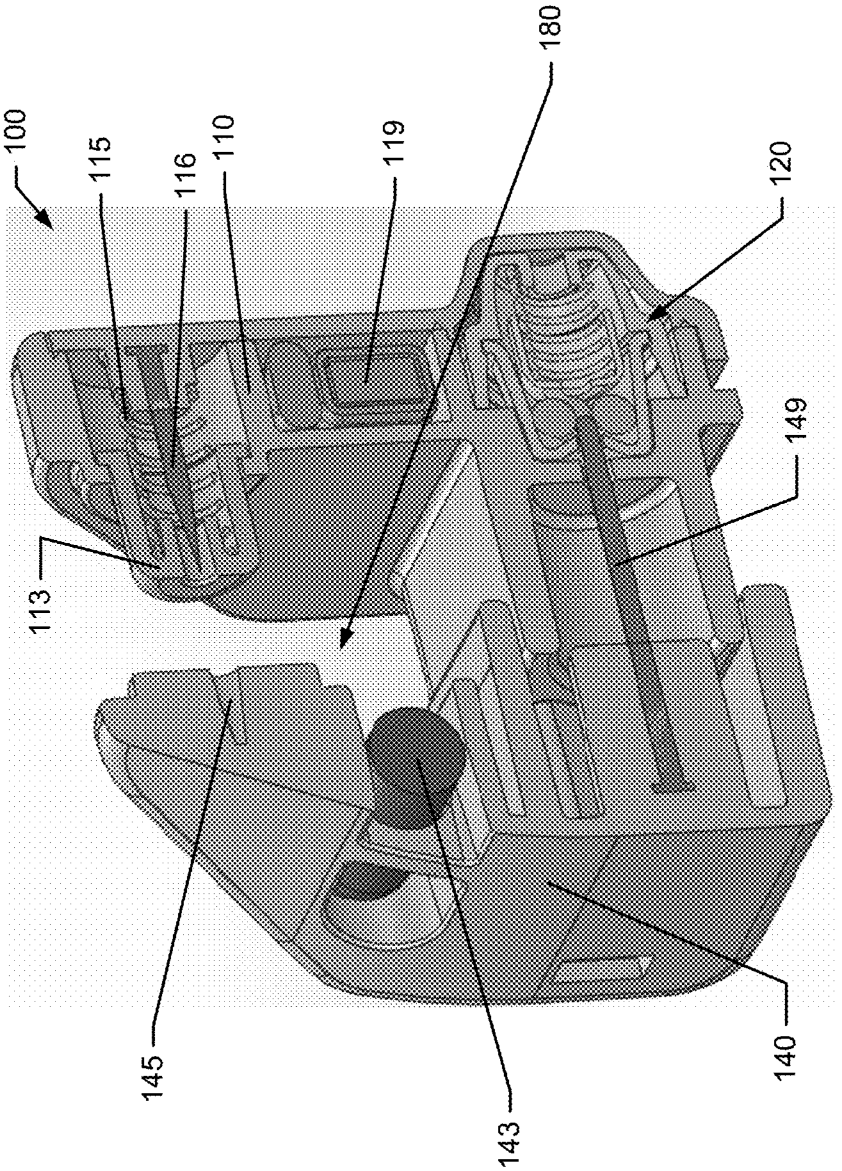
Figure 7:
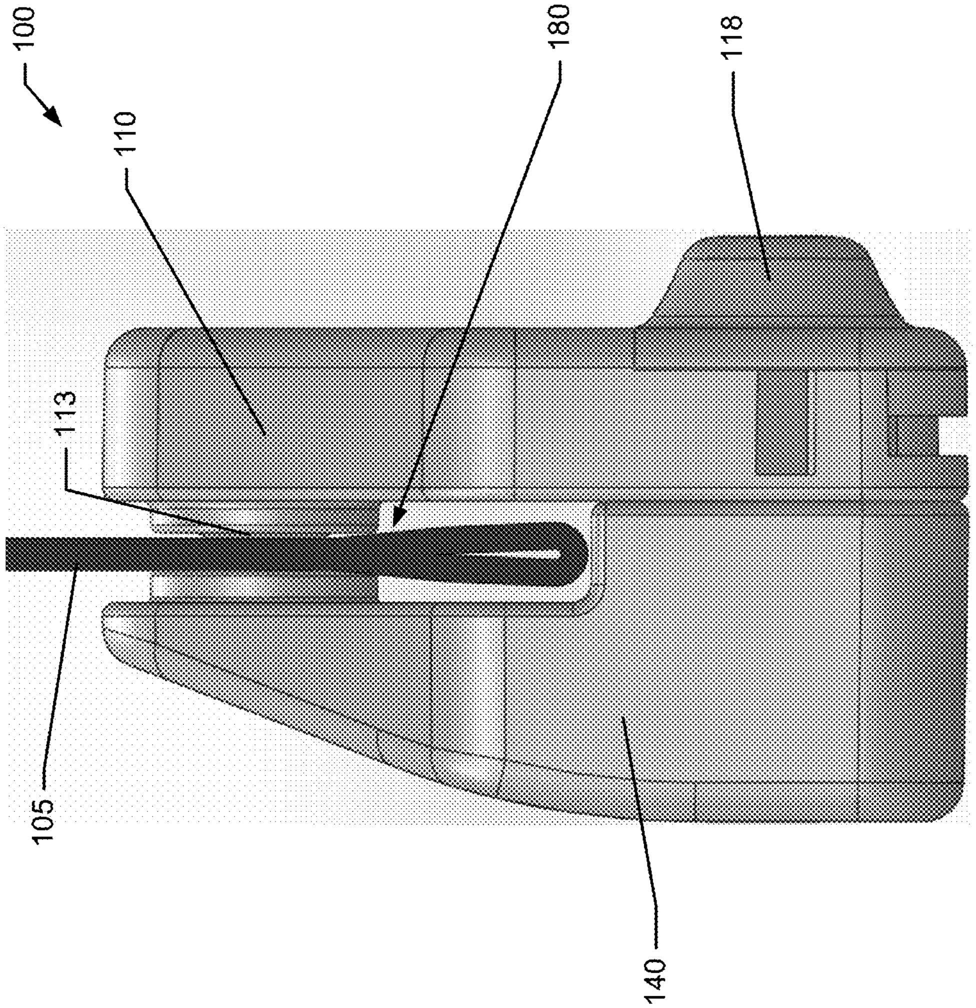
Figure 8:
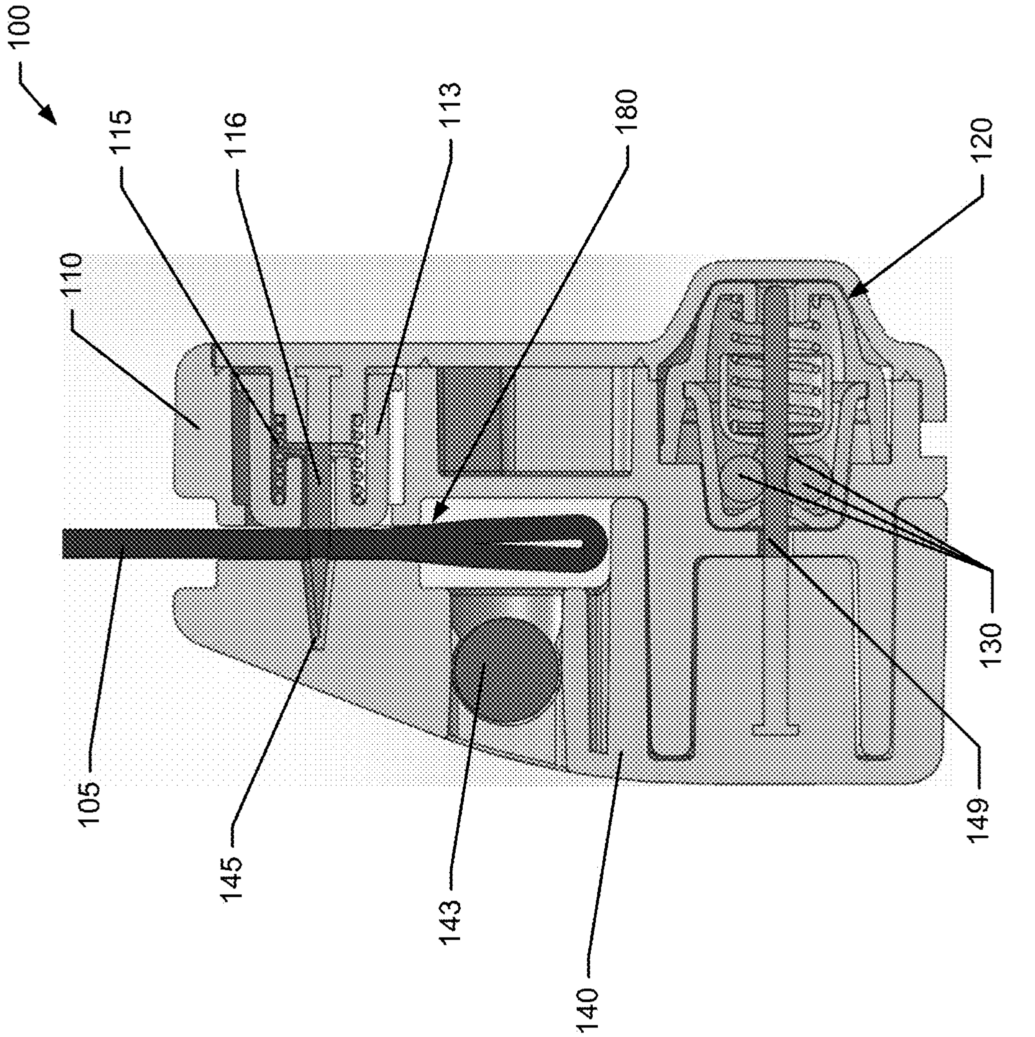
Figure 8A:
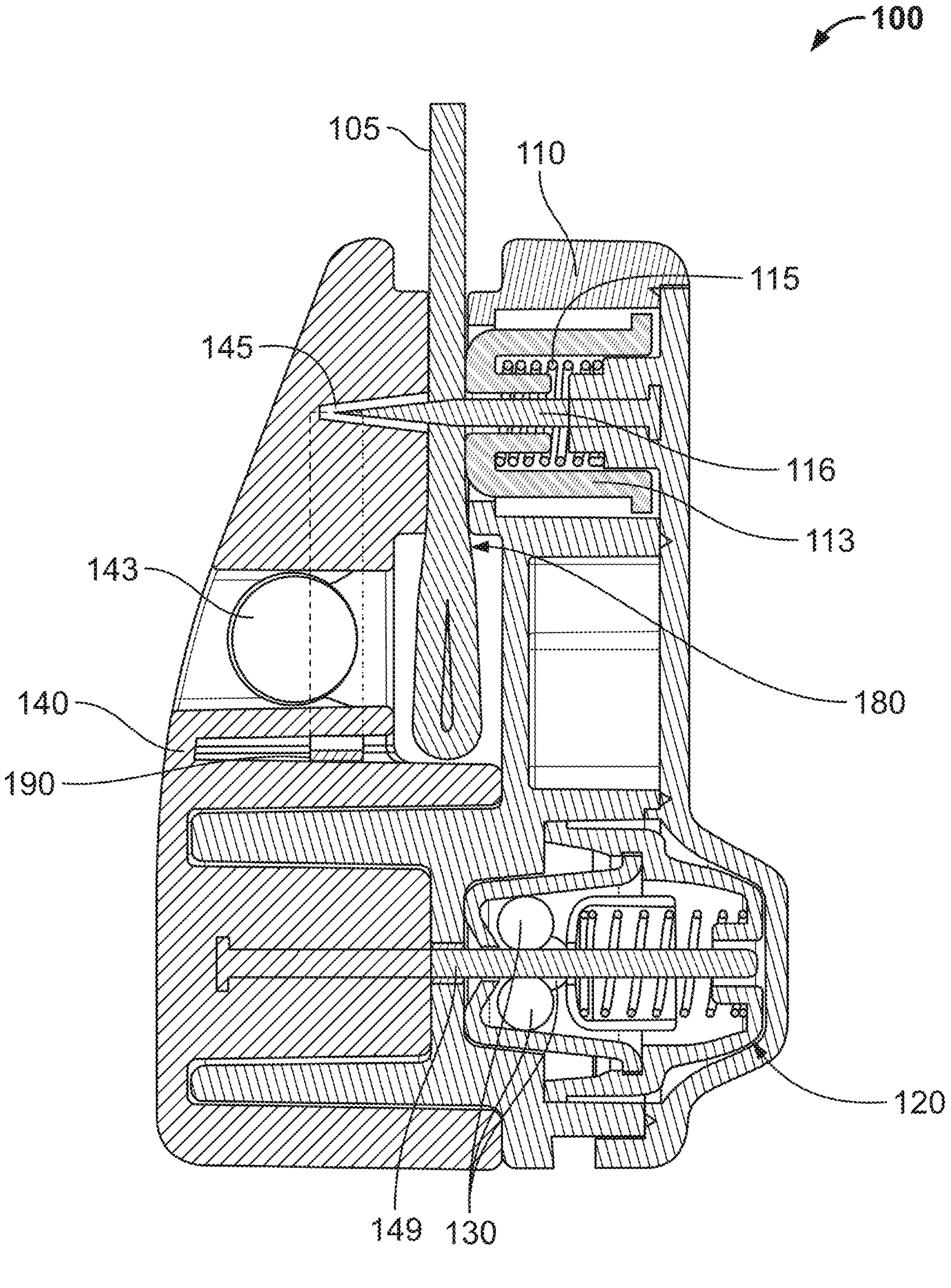
Figure 9:
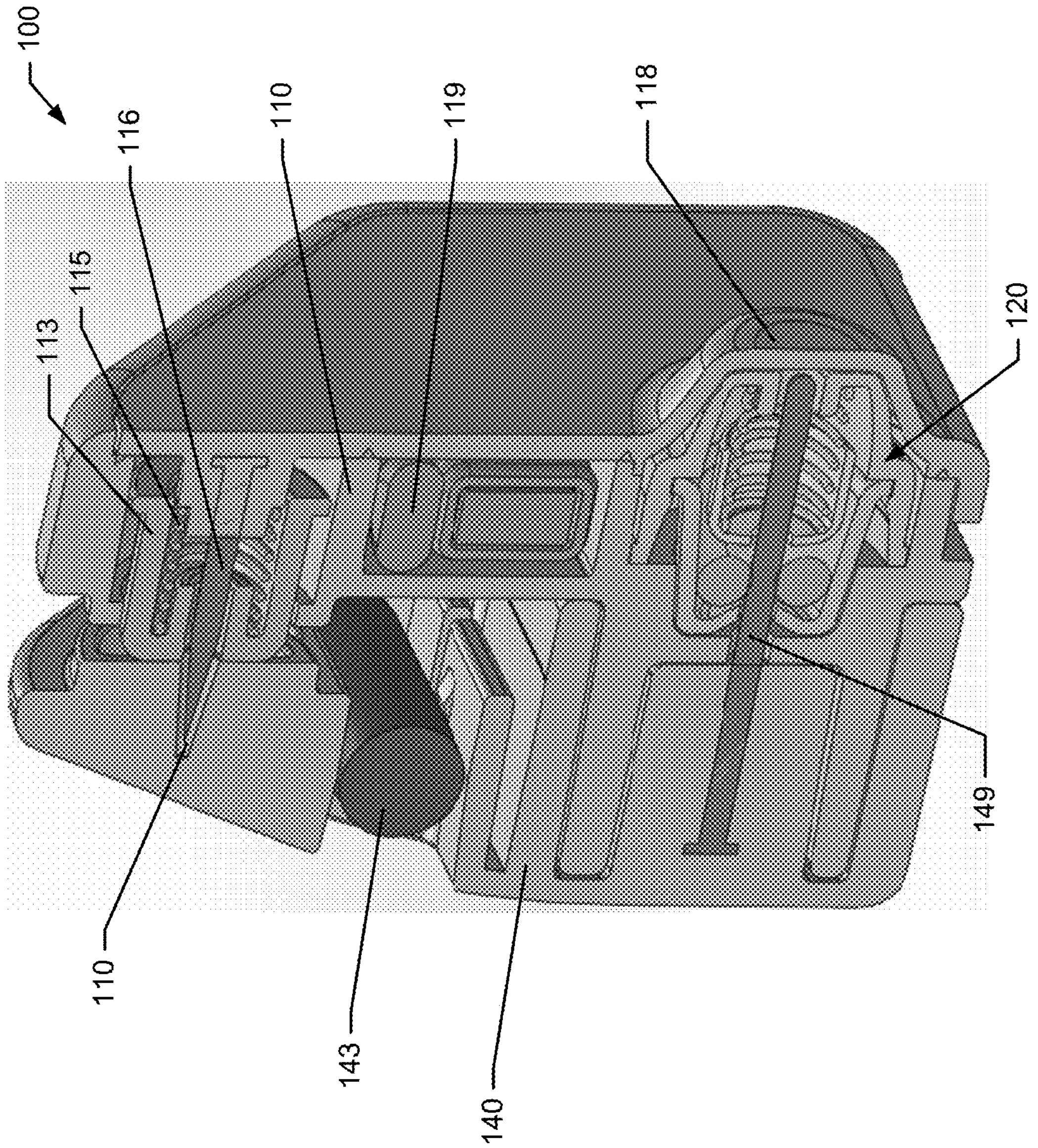
Figure 10:
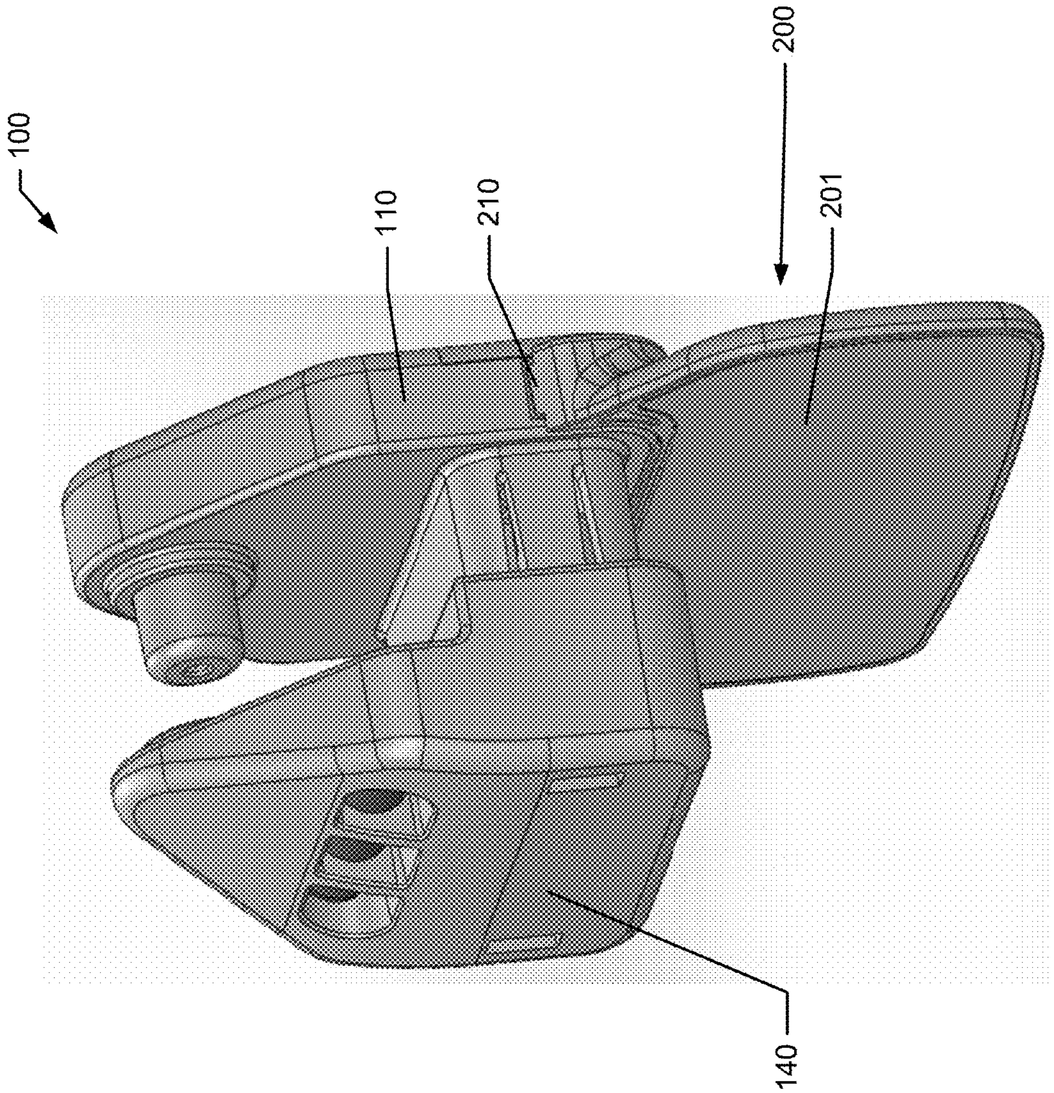
Figure 11:
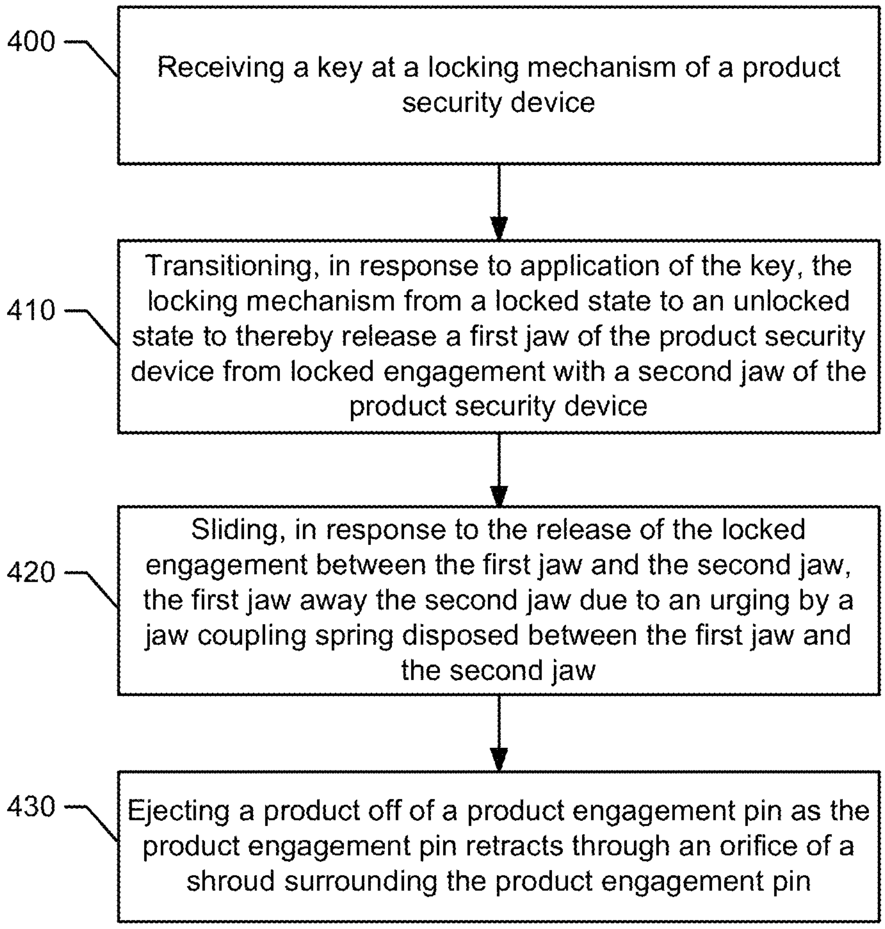

Having thus described some example embodiments in general terms, reference will now be made to the accompanying drawings, which are not necessarily drawn to scale, and wherein:

FIG. 1 shows a product security device affixed to an apparel article in accordance with some example embodiments;

FIG. 2 shows a perspective view of a product security device in an open position in accordance with some example embodiments;

FIG. 2A shows a perspective view of an alternative product security device, having one end cut away to show a signal emitting component, in an open position in accordance with some example embodiments;

FIG. 3 shows a exploded view of a product security device in accordance with some example embodiments;

FIG. 3A shows a exploded view of an alternative version of a product security device in accordance with some example embodiments;

FIG. 4 shows a side view of a product security device in an open position with a portion of an apparel article disposed in an opening between jaws of the product security device in accordance with some example embodiments;

FIG. 5 shows a side cross-section view of a product security device in an open position with a portion of an apparel article disposed in an opening between jaws of the product security device in accordance with some example embodiments;

FIG. 5A shows a side view of a product security device, including a signal emitting component, in an open position with a portion of an apparel article disposed in an opening between jaws of the product security device in accordance with some example embodiments;

FIG. 6 shows a perspective cross-section view of a product security device in an open position in accordance with some example embodiments;

FIG. 7 shows a side view of a product security device in a closed position with a portion of an apparel article disposed between jaws of the product security device in accordance with some example embodiments;

FIG. 8 shows a side cross-section view of a product security device in a closed position with a portion of an apparel article disposed between jaws of the product security device in accordance with some example embodiments;

FIG. 8A shows a side view of a product security device, including a signal emitting component, in a closed position with a portion of an apparel article disposed between jaws of the product security device in accordance with some example embodiments;

FIG. 9 shows a perspective cross-section view of a product security device in a closed position in accordance with some example embodiments;

FIG. 10 shows a product security device with an affixed accessory in accordance with some example embodiments; and FIG. 11 shows a block diagram of a method of detaching a product security device in accordance with some example embodiments.

DETAILED DESCRIPTION

Exemplary embodiments will be described more fully hereinafter with reference to the accompanying drawings, in which some, but not all embodiments of the invention are shown. Indeed, the embodiments take many different forms and should not be construed as being limiting. Rather, these example embodiments are provided so that this disclosure will satisfy applicable legal requirements. Like reference numerals refer to like elements throughout.

Example embodiments relate to a product security device that is configured to be affixed to a product, such as a garment or other apparel article. The product security device, when affixed to a product, may operate to deter theft and allow for product tracking at the exits of a store, or even throughout the store. In this regard, the product security device may include a radio frequency device or other signal emitting component that may, for example, trigger an alarm at the exits of the store or may transmit other information about the product to a separate radio frequency signal receiving device or other signal receiving device. Other information can include, by way of non-limiting examples, product specifications, product location, information about the manufacturer or seller, information about complimentary products, and the like. The product security device may be securely affixed to a product such that a specialized key (e.g., a magnetic key) may be required to remove the product security device from the product after or during the product purchasing process. The product security device may be affixed to the product in a manner that any attempts to tamper with or remove the product security device from the product without a key may result in the product being damaged and possibly unusable to a potential thief.

FIG. 1 shows an example product security device 100 affixed to an example apparel article 105, according to some example embodiments. As will be described further herein, the product security device 100 may clamp onto the apparel article 105 and a product engagement pin may pierce through the apparel article 105 to secure the product security device 100 to the apparel article 105.

FIGS. 2 and 2A show a perspective view of the example product security device 100 according to some example embodiments. The product security device 100 may include two slidably engaged components or jaws that are configured to slide relative to each other to clamp onto a product. The product security device 100 may include a first jaw 110 and a second jaw 140. In this regard, the first jaw 110 and the second jaw 140 may be operably coupled together to slide between an open position and a closed position.

The first jaw 110 and the second jaw 140 may include an engagement portion 111 and an engagement portion 141, respectively. The engagement portion 111 of the first jaw 110 may engage with the complementary engagement portion 141 of the second jaw 140 and permit the first jaw 110 to slide relative to the second jaw 140. In this regard, the first jaw 110 and the second jaw 140 may be configured to move relative to each other and may, for example, move into an open position as shown in FIG. 2 in the direction of the arrows 190 to thereby form a product insertion void 180 for receiving a portion of a product therein. Additionally, as described further herein, the engagement portion 111 and the engagement portion 141 may include features to lock (e.g., via a locking mechanism) the first jaw 110 in a closed position relative to the second jaw 140. As such, the locking mechanism may be operably coupled to the first jaw 110 and the second jaw 140. In a locked state, the locking mechanism may be configured to permit movement (e.g., relative movement) of the first jaw 110 towards the second jaw 140 but prevent movement of the first jaw 110 away from the second jaw 140. The engagement portion 111 and the engagement portion 141 may also include features to prevent the first jaw 110 from separating from or becoming detached from the second jaw 140 as the first jaw 110 slides away from second jaw 140.

Further, the first jaw 110 may include an extended jaw portion 112 that extends away from the engagement portion 111. The extended jaw portion 112 may include or house a shroud 113, which may include a shroud orifice 114. As further described herein, the shroud 113 may be movable relative to a product engagement pin affixed to the first jaw 110, and the shroud 113 may surround the product engagement pin. The product engagement pin may pass through the shroud orifice 114 when the product security device 100 is being affixed to a product. The shroud 113 may also include a product engagement surface 157 (i.e., a forward surface) that may engage (e.g., physically contact) a product when the product security device 100 is in a closed position. According to some example embodiments, the product engagement surface 157 and the shroud 113 may be stationary relative to the second jaw 140 and the product, as the product security device 100 moves from an open position to a closed position and product engagement pin 116 pierces through the product.

The second jaw 140 may also include an extended jaw portion 142 that may compliment the extended jaw portion 111 of the first jaw 110 and extend away from the engagement portion 141. The extended jaw portion 142 may include, according to some example embodiments, an ink capsule 143. The ink capsule 143 may be breakable and may be positioned and configured to break or burst in response to attempts to remove the product security device 100 by force without the use of a proper key, thereby performing a benefit denial function by dying or damaging the affixed product. The second jaw 140 may also include a pin receiving cavity that is configured to receive the product engagement pin when the product security device 100 is in a closed position. Further, as shown in FIG. 2A, the second jaw may include a signal emitting component 190. The signal emitting component 190 may be any type of known signal emitting component including, as non-limiting examples, radio frequency emitting devices (RFID antennas, for example), Wi-Fi signal emitting devices, Bluetooth and Bluetooth Low Energy (BLE) devices, Ultra Wide Band (UWB) devices, NFC devices, and other similar signal emitting components. In FIG. 2A the signal emitting device 190 is configured to fit in a cavity within the second jaw 140. The signal emitting device 190 can be configured to fit within any cavity space within the second jaw 140. Alternatively, and not shown in the drawings, the signal emitting device can be configured to fit and placed within the first jaw 110. Further, also not shown, a QR code or barcode can be affixed to the security device 100 which is unique to the product to which the security device 100 is attached. The QR code or barcode can be printed directly on the device itself or a medium such as a paper or plastic tag or label material and affixed directly or indirectly to the security device 100 by adhesive or by a mechanical fastener in a removable or non-removable fashion.

FIGS. 3 and 3A show an exploded view of the example product security device 100 according to some example embodiments. The first jaw 110 may comprise a body 155 and a cover plate 117. The body 155 may include the extended jaw portion 112 and the engagement portion 111. Further, the body 155 may also include a shroud receiving channel 121, a circuitry cavity 122, a clutch receiving channel 156, sliding stops 124, and accessory attachment recesses 123. As further described with respect to FIG. 10, the accessory attachment recesses 123 may be configured to facilitate attachment of an accessory to the product security device 100.

The shroud receiving channel 121 may be disposed within the extended jaw portion 112 and may be configured to receive the shroud 113 and further house the shroud 113 when the shroud 113 is in a retracted position. The shroud receiving channel 121 may have a circular internal cross-section. The shroud 113 may have a lip 125 that may also have a circular external cross-section. However, it is contemplated that other complementary cross-sectional shapes may alternatively be used. The internal diameter of the shroud receiving channel 121 may be larger than the external diameter of the lip 125, thereby permitting the shroud 113 to slide within the shroud receiving channel 121. The shroud receiving channel 121 may include a catch 126 that is configured to engage the lip 125 of the shroud 113 to prevent the shroud 113 from further movement beyond an extended position towards the second jaw 140.

The circuitry cavity 122 may be configured to house, for example, a resonant circuit device 119. The resonant circuit device 119 may comprise a ferrite rod with a coiled wire to form an inductor, where the wire is electrically connected to a capacitor. The resonant circuit device 119 may be configured to receive an electromagnetic field generated by a gate device installed at the exits of a store and resonate in response to the field. When resonating, the resonant circuit device 119 may emit a responsive radio frequency signal that may be detected by the gate device. The gate device may alarm in response to the radio frequency signal, because receipt of the signal may indicate that a product affixed to the product security device 100 has not been purchased or is attempting to be stolen.

The clutch receiving channel 156 of the body 155 may be configured to house a clutch assembly 120, and may include a stop feature that prevents movement of the clutch assembly 120 toward the second jaw 140. The clutch assembly 120, which may comprise a plurality of locking balls, may operate in conjunction with a locking pin 149 to lock the first jaw 110 to the second jaw 140, when the first jaw 110 and the second jaw 140 are in a locked state. According to some example embodiments, the locking pin 149 and the clutch assembly 120 may together be example components of a locking mechanism for the product security device 100. In this regard, the clutch assembly 120 may operate to permit movement of the locking pin 149 into the clutch assembly 120, but prevent movement of the locking pin 149 out of the clutch assembly 120 unless a key (e.g., a magnetic key) is applied in proximity to the clutch assembly 120.

The body 155 may also include a slide stop 124 disposed on the engagement portion 111. In this regard, the body 155 may include a slide stop 124 on each side of the engagement portion 111. A slide stop 124 may be configured to engage with a stop 148 on the second jaw 140 to stop further movement of the first jaw 110 away from the second jaw 140, for example, when the locking mechanism is in an unlocked state. Movement of the first jaw 110 away from the second jaw 140 may be a result of a biasing force applied between the first jaw 110 and the second jaw 140 by the release springs 150 which are biased to urge the first jaw 110 away from the second jaw 140. In this regard, when a key is applied to a portion of the locking mechanism, in this instance the clutch assembly 120, a locking force applied by the locking balls on the locking pin 149 may be released, thereby permitting the first jaw 110 to slide away from the second jaw 140. As a result, the release springs 150 may force the product security device 100 into an open position where the slide stop 124 engages with the stop 148.

The cover plate 117 may be affixed (e.g., permanently) to the body 155. In this regard, the cover plate 117 may operate to maintain the resonant circuit device 119 within the circuitry cavity 122 and the clutch assembly 120 in the clutch receiving channel 156. Further, the cover plate 117 may be configured to maintain the shroud 113 within the shroud receiving channel 121. Additionally, the cover plate 117 may include the product engagement pin 116, which may be received in the shroud orifice 114. The product engagement pin 116 may have a sharp tip that is capable of piercing through, for example, apparel fabrics without damaging the fabric. According to some example embodiments, the product engagement pin 116 may be affixed to the first jaw 110 via, for example, the cover plate 117. Further, the product engagement pin 116 may be configured to fasten the product security device 100 to a product by piercing through the product and being received by the second jaw 140.

According to some example embodiments, a shroud spring 115 may be operably coupled to the first jaw 110 and disposed between the shroud 113 and the cover plate 117. The shroud spring 115 may operate to urge the shroud 113 towards the second jaw 140 into an extended position where the lip 125 abuts the catch 126 in response to the first jaw 110 and the second jaw 140 being in an open position. The shroud spring 115 may also operate to eject the product off of the product engagement pin 116 when the product security device 100 is unlocked and permitted to transition from a closed position to an open position. In other words, the shroud 113 may be configured to eject the product off of the product engagement pin 116 in response to the first jaw 110 and second jaw 140 transitioning from the closed position to the open position, for example, due to the locking mechanism being transitioned to the unlocked state and the biasing of the release springs 150.

The cover plate 117 may also include a key locator 118. The key locator 118 may be, for example, a dimple on an exterior surface of the cover plate 117 to assist a user with positioning a key (e.g., a magnetic key) proximate to the clutch assembly 120 to place the locking assembly into an unlocked state. In this regard, according to some example embodiments, a magnetic key applied at the key locator 118 may introduce a magnetic field that operates to transition the locking mechanism into an unlocked state, for example, by moving an internal ferrous metal cup within the clutch assembly 120 to release pressure being applied by the locking balls on the locking pin 149. In this regard, according to some example embodiments, the locking mechanism may be configured to transition into an unlocked state in response to application of a key to the product security device 100. When the locking mechanism is in the unlocked state, the first jaw 110 and the second jaw 140 may be released from a locked engagement, thereby permitting the first jaw 110 to slide away from the second jaw 140 into the open position.

Continuing to refer to FIG. 3, the second jaw 140 may include release spring cavities 144, a product engagement pin receiving cavity 145, an ink capsule receiving channel 146, ink capsule retaining bumps 147, stops 148, and a locking pin 149. The release spring cavities 144 may be cylindrical cavities configured to receive and retain respective release springs 150. The product engagement pin receiving cavity 145 may be configured to receive the product engagement pin 116 when the product security device 100 is in a closed position. In this regard, the product engagement pin 116 need not be secured in the product engagement pin receiving cavity 145. Rather, the product engagement pin 116 may, according to some example embodiments, simply be received into the product engagement pin receiving cavity 145 and need not operate to perform any function to lock the first jaw 110 to the second jaw 140.

The ink capsule receiving channel 146 may be at least partially open to both an interior side and an exterior side of the second jaw 140 to permit ink to be discharged in both directions if the ink capsule 143 is broken. The ink capsule 143 may be retained in the ink capsule receiving channel 146 by the ink capsule retaining bumps 147. In this regard, according to some example embodiments, the ink capsule retaining bumps 147 may operate to hold the ink capsule 143 in place within the ink capsule receiving channel 146, but may also be configured to permit removal of the ink capsule 143 from the ink capsule receiving channel 146 when the product security device 100 is an open position, for example, after the ink capsule 143 has discharged ink to permit reuse of the product security device 100. According to some example embodiments, the ink capsule 143 may be permanently maintained within the ink capsule receiving channel 146, and therefore, the ink capsule 143 may not be removed and replaced after the ink capsule 143 has discharged the ink.

As described otherwise herein, the stops 148 may be configured to prevent further movement and separation of the first jaw 110 away from the second jaw 140. According to some example embodiments, the stops 148 may be formed as ramps that permit the slide stop 124 of the first jaw 110 to ride up the ramps as the first jaw 110 moves towards the second jaw 140 during assembly of the product security device 100. When the slide stop 124 passes the pinnacle of the ramp of the stop 148, a ridge of the slide stop 124 may drop behind the ramp and be secured behind the ramp. As such, the ridge of the slide stop 124 may be prevented from moving past a back surface of the ramp of the stop 148, thereby preventing the first jaw 110 from being separated from the second jaw 140.

As described elsewhere herein, the locking pin 149 may be a component of the locking mechanism of the product security device 100. The locking pin 149 may be affixed to the second jaw 140 on one end, and extend away from the second jaw 140 towards the first jaw 110 at the other end. The locking pin 149 may be configured to engage with the clutch assembly 120 to lock the locking pin 149 in the clutch assembly 120 unless a key is applied. According to some example embodiments, the locking pin 149 may have a blunt tip relative to the tip of the product engagement pin 116, which may have a relatively sharper tip.

Further, as shown in FIG. 3A, a signal emitting device 190 (in broken lines) is shown incorporated into the second jaw 140. The signal emitting device 190 is the same as noted in the description of FIG. 2A, and can be alternately included in the first jaw 110.

Having described some of the various physical features and some functions of the example product security device 100, FIGS. 4-9 will now be described to show the operation of the product security device 100 in an open position and in a closed and locked position. In this regard, FIG. 4 shows the example product security device 100 in an open position with a portion of an apparel article 105 positioned in the product insertion void 180 formed by the first jaw 110 and the second jaw 140. As described herein, an open position may be a position where the product engagement pin 116 of the product security device 100 is not pierced through a product and the shroud 113 is in the extended position. Further, a closed position may be when the product engagement pin 116 has entered the product engagement pin receiving cavity 145.

When the product security device 100 is in an open position, the shroud spring 115 may force the shroud 113 into the extended position, thereby concealing the product engagement pin 116. In this regard, the shroud 113 may extend beyond the tip of the product engagement pin 116 in response to the shroud 113 being in the extended position. Accordingly, because the tip of the product engagement pin 116 is sharp and may pose a safety issue to a user, the shroud 113 may perform a safety function to reduce the likelihood that the pin may prick a user, because the product engagement pin 116 does not exit the shroud orifice 114 until a product is adjacent the product engagement surface 157 of the shroud 113. Additionally, when the product security device 100 is in an open position, the slide stop 124 may be engaged with the stop 148.

FIG. 5 shows a cross-section view of internal components of the example product security device 100 when the product security device 100 is in an open position. In this regard, the shroud 113 is shown in the extended position where the lip 125 of the shroud 113 is engaged with the catch 126 of the shroud receiving channel 121. Further, the biasing provided by the shroud spring 115 urges the shroud 113 towards the second jaw 140 and into the extended position.

Further, the locking pin 149 is shown as engaging the locking balls 130 of the clutch assembly 120. In this regard, the components of an example clutch assembly 120 are shown. According to some example embodiments, the clutch assembly 120 may include the locking balls 130, a front housing cup 129, a rear housing cup 127, an internal cup 158, and a clutch spring 128. In operation, the clutch spring 128 may force the internal cup 158 towards the locking balls 130 which may be retained by the front housing cup 129. The clutch spring 128 may be further retained by the rear housing cup 127, opposite the front housing cup 129. Due to a concave shape of the front housing cup 129, the locking balls 130 are forced into engagement with the locking pin 149 and are restrained from moving out of engagement with the locking pin 149 by the internal cup 158 when the locking mechanism is in a locked state. In the locked state, the locking pin 149 may be permitted to move further into the clutch assembly 120 (i.e., the first jaw 110 may move closer to the second jaw 140), but the locking pin 149 may be restrained from moving out of the clutch assembly 120 (i.e., the first jaw 110 is restrained from moving away from the second jaw 140). However, when a magnetic key is applied proximate the rear housing cup 127, the internal cup 158 may be pulled away from the locking balls 130 (i.e., the locking mechanism is in an unlocked state), thereby permitting the locking balls 130 to disengage from the locking pin 149 and permitting the locking pin 149 to move out of the clutch assembly 120. The first jaw 110 may therefore move away from the second jaw 140.

Another view of the product security device 100 in an open position is provided in FIG. 6. In this regard, FIG. 6 shows a perspective cross-section view of the example product security device 100. In addition to providing another view of the features of the example product security device 100 as shown in FIG. 5, FIG. 6 shows the resonant circuit device 119 housed in the first jaw 110. According to some example embodiments, it is contemplated that the resonant circuit device 119 may be alternatively housed in the second jaw 140, possibly in place of the ink capsule 143. Similarly, the ink capsule 143 may be alternatively housed in the first jaw 110, possibly in a position similar to the resonant circuit device 119 as shown in FIG. 6.

FIG. 7 shows the example product security device 100 in a closed position. In the closed position, the shroud 113 is fully retracted into the first jaw 110, for example, due to engagement with the apparel article 105 and the second jaw 140. To transition into the closed position, the first jaw 110 may slide towards the second jaw 140, until the product engagement surface 157 of the shroud 113 comes into contact with the apparel article 105. As the sliding motion continues, the product engagement pin 116 may emerge from the shroud 113 through the shroud orifice 114 and pierce the apparel article 105. According to some example embodiments, the product engagement pin 116 may be configured to pass through the shroud orifice 114 and engage the product (e.g., apparel article 105) as the first jaw 110 and the second jaw 140 transition from an open position to a closed position and the shroud 113 retracts into the first jaw 110. With continued sliding movement, the shroud 113 is further retracted into the first jaw 110 and the product engagement pin 116 may pierce through the apparel article 105 and be received by the product engagement pin receiving cavity 145 of the second jaw 140, and the locking pin 149 may continue to slide into the clutch assembly 120 and be locked into place as shown in FIG. 8.

FIG. 8 shows a cross-sectional view of the example product security device 100 in the closed position in engagement with the apparel article 105, and FIG. 9 shows a similar perspective view of the example product security device 100, albeit without the apparel article 105. In this regard, in addition to showing the product engagement pin 116 piercing the apparel article 105, FIG. 8 shows the shroud 113 being fully retracted into the first jaw 110 against the biasing force provided by the shroud spring 115 (and against the biasing force provided by the release springs 150 not shown in FIG. 8). The locking pin 149 is also shown as penetrating into the clutch assembly 120. The resonant circuit device 119 is shown in the circuitry cavity 122 in FIG. 9.

FIGS. 5A and 8A are alternative embodiments of FIGS. 5 and 8 but include the signal emitting component 190 in second jaw 140.

Having described some of the dynamic operational features of the example product security device 100, FIG. 10 shows the product security device 100 in engagement with an accessory 200. The accessory 200 may be mountable to either the first jaw 110 or second jaw 140 and may extend away from the first jaw 110 or the second jaw 140, respectively. In the example embodiment of FIG. 10, however, the accessory 200 is shown in engagement with the first jaw 110 via the accessory attachment recesses 123. In this regard, the accessory 200 may comprise attachment nubs 210 that are formed for complimentary engagement with the accessory attachment recesses 123 to attach the accessory 200 to the product security device 100.

The accessory 200 may include or house any type of accessory element 201. In some example embodiments, the accessory element 201 may be a printed label or an electronic label with a display that can be modified via a wireless communication. In this regard, the accessory element 201 may provide information such as product branding information, pricing information about the product, or the like. In some example embodiments, the accessory element 201 may include, for example, an antenna. In this regard, the accessory element may be a wireless tag such a RFID tag. The RFID tag may permit the product security device 100 to be counted via a cycle count process for inventory tracking with respect to the product to which the product security device 100 is affixed. Further, the RFID tag may also be used during a purchasing transaction and be interrogated to identify the product to which the product security device 100 is attached for a point of sale system.

As an alternative embodiment to the device as shown in FIG. 10, the embodiments shown in FIGS. 2A, 3A, 5A and 8A incorporate a signal emitting component 190 directly into the security device 100. The signal emitting component 190 may be any type of known signal emitting component including, as non-limiting examples, radio frequency emitting devices (RFID antennas or tags, for example), Wi-Fi signal emitting devices, Bluetooth and Bluetooth Low Energy (BLE) devices, Ultra Wide Band (UWB) devices and other similar signal emitting components. In each of FIGS. 2A, 3A, 5A and 8A, the signal emitting device 190 is configured to fit in a cavity within the second jaw 140. The signal emitting device 190 can be configured to fit within any cavity space within the second jaw 140. The signal emitting device 190 can be adhesively or mechanically attached to the security device 100, or the signal emitting device can rest inside an internal cavity region in the security device 100. Alternatively, and not shown in the drawings, the signal emitting device can be configured to fit and be placed within the first jaw 110. Further, also not shown, a QR code or barcode can be affixed to the security device 100 which is unique to the product to which the security device 100 is attached. The QR code or barcode can be printed directly on the device or on a medium such as a paper or plastic tag or label material and affixed directly or indirectly to the security device 100 by adhesive or by a mechanical fastener in a removable or non-removable fashion. A security device 100 that includes a signal emitting component 190, a QR or a barcode, or a combination of these, each individually described above, may, for example, trigger an alarm at the exits of the store or may transmit other information about the product to a separate radio frequency signal receiving device or other signal receiving device which is designed to receive and process a signal from the signal emitting component 190 used in the security device 100. Other information which can be accessed and/or processed by a signal receiving device, and ultimately used by an end user of the signal receiving device, can include, by way of non-limiting examples, product specifications, product location, information about the manufacturer or seller, information about complimentary products, and the like.

FIG. 11 shows a block diagram of a method of operating a product security device, such as the example product security device 100, to remove the product security device from a product in accordance with some example embodiments. The example method of FIG. 11 includes, at 400, receiving a key at a locking mechanism of a product security device. At 410, the example method includes transitioning, in response to application of the key, the locking mechanism from a locked state to an unlocked state to thereby release a first jaw of the product security device from locked engagement with a second jaw of the product security device. The example method further comprises, at 420, sliding, in response to the release of the locked engagement between the first jaw and the second jaw, the first jaw away from the second jaw due to an urging caused by a release spring disposed between the first jaw and the second jaw.

At 430, the example method includes ejecting a product off of a product engagement pin as the product engagement pin retracts through an orifice of a shroud surrounding the product engagement pin. In this regard, the product engagement pin may be affixed to the first jaw of the product security device and the product engagement pin may be urged away from the second jaw by the release spring. Further, the shroud may be urged towards the second jaw by a shroud spring disposed between the shroud and the first jaw to move the shroud into an extended position as the first jaw slides away from the second jaw. In the extended position the shroud may extend beyond the tip of the product engagement pin to conceal the product engagement pin when the product security device is in an open position. Once the product security device 100 is removed from an article or product to which it was attached by the method outlined in the preceding paragraphs and as outlined in, for example, FIG. 11, the security device can be reset and reused. In an embodiment such as that described in FIGS. 2A, 3A, 5A and 8A, for example, which contains a signal emitting component 190, the signal emitting component 190 can be allowed to retain the information originally included onto the signal emitting component, or the information can be changed to allow the product security device 100 to be used with a different article or to transmit different information.

Many modifications and other embodiments of the invention set forth herein will come to mind to one skilled in the art to which this invention pertains, having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A product security device comprising:

a first jaw;

a second jaw, wherein the first jaw and the second jaw are operably coupled together to slide between an open position and a closed position;

a locking mechanism operably coupled to the first jaw and the second jaw, wherein, in a locked state, the lock is configured to permit movement of the first jaw towards the second jaw but prevent movement of the first jaw away from the second jaw;

a signal emitting component;

a product engagement pin affixed to the first jaw, the product engagement pin being configured to be received at least partially into the second jaw to fasten the product security device to a product when the first jaw and the second jaw are in the closed position; and a release spring, the release spring being configured to urge the first jaw away from the second jaw.

2. The product security device of claim 1, wherein the product engagement pin does not operate to lock the first jaw to the second jaw.

3. The product security device of claim 1 further comprising:

a shroud having a shroud orifice, the shroud surrounding the product engagement pin and being operably coupled to the first jaw such that the shroud is movable relative to the product engagement pin, wherein the product engagement pin is configured to pass through the shroud orifice and engage the product as the first jaw and second jaw transition from the open position to the closed position and the shroud retracts into the first jaw; and a shroud orifice on the shroud, wherein the product engagement pin is configured to pass through the shroud orifice as the first jaw and second jaw transition from the open position to the closed position; and a shroud spring operably coupled to the first jaw and configured to urge the shroud towards the second jaw;

wherein a front surface of the shroud engages the product and is stationary relative to the product as the product engagement pin pierces through the product.

4. The product security device of claim 3, wherein the shroud spring is configured to urge the shroud into an extended position in response to the first jaw and the second jaw being in the open position; and wherein the shroud extends beyond the tip of the product engagement pin in response to the shroud being in the extended position.

5. The product security device of claim 3, wherein the shroud is further configured to eject the product off of the product engagement pin in response to the first jaw and second jaw transitioning from the closed position to the open position.

6. The product security device of claim 1, wherein the lock comprises a locking pin and a clutch assembly.

7. The product security device of claim 6, wherein the locking pin is affixed to the second jaw and the clutch assembly is housed in the first jaw.

8. The product security device of claim 6, wherein a tip of the product engagement pin is sharper than a tip of the locking pin.

9. The product security device of claim 1, wherein the signal emitting component is selected from the group comprising a radio frequency emitting device (RFID), Wi-Fi signal emitting device, Bluetooth device, Bluetooth Low Energy (BLE) device, Ultra Wide Band (UWB) device, Near Field Communication (NFC) device or a combination thereof.

10. The product security device of claim 1, further comprising a breakable ink capsule affixed to the first jaw or the second jaw.

11. The product security device of claim 1, wherein the lock is configured to transition into an unlocked state in response to application of a key to the product security device, wherein, when the lock is in the unlocked state, the first jaw and the second jaw are released from locked engagement, thereby permitting the first jaw to slide away from the second jaw into the open position.

12. The product security device of claim 11, wherein the key comprises a magnet and the lock is configured to transition into the unlocked state in response to a magnetic field of the magnet.

13. The product security device of claim 1, further comprising resonant circuitry configured to emit a radio frequency, the resonant circuitry being disposed within the first jaw or the second jaw.

14. The product security device of claim 1, further comprising a QR or barcode which is attached to an external surface of the security device.

15. A product security device comprising:

a first jaw;

a second jaw, wherein the first jaw and the second jaw are operably coupled together to slide between an open position and a closed position;

a product engagement pin affixed to the first jaw, the product engagement pin being configured to fasten the product security device to a product by piercing through the product and being received by the second jaw;

a signal emitting component; and a shroud having a shroud orifice, the shroud surrounding the product engagement pin and being operably coupled to the first jaw such that the shroud is movable relative to the product engagement pin;

wherein the product engagement pin is configured to pass through the shroud orifice and engage the product as the first jaw and second jaw transition from the open position to the closed position and the shroud retracts into the first jaw.

16. The product security device of claim 15, further comprising a shroud spring operably coupled to the first jaw and configured to urge the shroud towards the second jaw; and wherein a front surface of the shroud engages the product in response to the product engagement pin piercing the product.

17. The product security device of claim 16, wherein the shroud spring is configured to urge the shroud into an extended position in response to the first jaw and the second jaw sliding into the open position; and wherein the shroud extends beyond a tip of the product engagement pin in response to the shroud extending into the extended position.

18. The product security device of claim 16, wherein the shroud is further configured to eject the product off of the product engagement pin in response to the first jaw and second jaw transitioning from the closed position to the open position.

19. A product security device comprising:

a first jaw;

a second jaw, wherein the first jaw and the second jaw are operably coupled together to slide between an open position and a closed position;

a locking mechanism operably coupled to the first jaw and the second jaw, wherein, in a locked state, the lock is configured to permit movement of the first jaw towards the second jaw but prevent movement of the first jaw away from the second jaw;

a signal emitting component;

a product engagement pin affixed to the first jaw, the product engagement pin being configured to be received at least partially into the second jaw to fasten the product security device to a product when the first jaw and the second jaw are in the closed position;

a shroud having a shroud orifice, the shroud surrounding the product engagement pin and being operably coupled to the first jaw such that the shroud is movable relative to the product engagement pin, wherein the product engagement pin is configured to pass through the shroud orifice and engage the product as the first jaw and second jaw transition from the open position to the closed position and the shroud retracts into the first jaw; and a shroud orifice on the shroud, wherein the product engagement pin is configured to pass through the shroud orifice as the first jaw and second jaw transition from the open position to the closed position; and a shroud spring operably coupled to the first jaw and configured to urge the shroud towards the second jaw;

wherein a front surface of the shroud engages the product and is stationary relative to the product as the product engagement pin pierces through the product.

20. The product security device of claim 19, wherein the shroud spring is configured to urge the shroud into an extended position in response to the first jaw and the second jaw being in the open position; and wherein the shroud extends beyond the tip of the product engagement pin in response to the shroud being in the extended position.

21. The product security device of claim 19, wherein the shroud is further configured to eject the product off of the product engagement pin in response to the first jaw and second jaw transitioning from the closed position to the open position.

* * * * *